United States Patent
Agarwal et al.

(10) Patent No.: US 6,246,777 B1
(45) Date of Patent: Jun. 12, 2001

(54) COMPRESSION-TOLERANT WATERMARKING SCHEME FOR IMAGE AUTHENTICATION

(75) Inventors: Saurabh Agarwal, New Delhi (IN); Alok Aggarwal, Chappaqua, NY (US); Harpal Singh Bassali, New Delhi (IN); Jatin Chhugani, New Delhi (IN); Pradeep Kumar Dubey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,055

(22) Filed: Mar. 19, 1999

(51) Int. Cl.[7] ................................................ G06K 9/00
(52) U.S. Cl. .............................................................. 382/100
(58) Field of Search ................................... 382/100, 232; 380/210, 287, 54

(56) References Cited

U.S. PATENT DOCUMENTS

| | | | |
|---|---|---|---|
| 5,530,759 | * | 6/1996 | Braudaway et al. ............... 380/54 |
| 5,708,717 | * | 1/1998 | Alasia ................................. 380/51 |
| 5,875,249 | * | 2/1999 | Mintzer et al. ..................... 380/54 |
| 5,901,178 | * | 5/1999 | Lee et al. ........................... 375/240 |
| 5,905,800 | * | 5/1999 | Moskowitz et al. ................ 380/28 |
| 5,960,081 | * | 9/1999 | Vynne et al. ....................... 713/176 |
| 6,021,196 | * | 2/2000 | Sanford, II et al. ................ 713/176 |
| 6,037,984 | * | 3/2000 | Isnardi et al. ...................... 375/240.21 |
| 6,064,764 | * | 5/2000 | Bhaskaran et al. ................ 382/183 |
| 6,163,842 | * | 12/2000 | Barton ............................... 713/176 |

OTHER PUBLICATIONS

"Transform permuted watremarking for copyright protection of digital video" by Johnson et al., IEEE, Globecom, Nov. 8, 1998.*

* cited by examiner

Primary Examiner—Andrew W. Johns
Assistant Examiner—Shervin Nakhjavan
(74) Attorney, Agent, or Firm—McGuireWoods, LLP; Stephen C. Kaufman, Esq.

(57) ABSTRACT

A verification system for still images that embeds a watermark so that no visual artifacts are created in the images and thus maintains the visual quality of the image. The algorithm embeds information in an uncompressed image so as to later detect the alteration of the image, as well as the location of the alteration. The embedding of information into a source image is based on a defined mapping process. An image plane consists of macroblocks, which are themselves comprised of microblocks. A code is embedded corresponding to the value of this image property in each macroblock. The specific sequence of microblocks used for embedding this information in the watermarking image plane is a unique function of this property for the corresponding set of microblocks in the indexing image plane. This information can be later decoded from the stamped image. The watermark is embedded by combining the pixel values of the image with the watermark. The watermark is altered if the image is altered.

27 Claims, 17 Drawing Sheets

COMPRESSION-TOLERANT WATERMARKING SCHEME FOR IMAGE AUTHENTICATION

DESCRIPTION

BACKGROUND OF THE INVENTION

1. Field of the Invention

The present invention generally relates to a verification system for still images and, more particularly, to a technique that embeds a watermark so that no visual artifacts are created in the image.

2. Background Description

Watermarking is seen as a viable solution for the authentication of multimedia data and hence its security. Because of the huge size, color images as well as grey-scale images are usually kept in some standard compressed format, e.g., JPEG (Joint Photographers Experts Group). An imperceptible watermark (or watermark, for short) is defined as an alteration of the data set that is not perceptible to a human, but can be recognized by a machine such as a computer or a pervasive computing device.

SUMMARY OF THE INVENTION

It is therefore an object of the present invention to provide a verification system for still images that embeds a watermark so that no visual artifacts are created in the images, and the visual quality of the image is thus maintained.

According to the invention, there is provided an algorithm to embed information in an uncompressed image so as to later detect the alteration of the image, as well as the location of the alteration. The embedding of information into a source image is based on a defined mapping process; this information can be later decoded from the stamped image. The watermark is embedded by combining the pixel values of the image with the watermark. So if an attempt is made to alter the image, the watermark is also altered and the alteration of the watermark is captured during the verification process.

This invention provides a novel, low-overhead, watermarking scheme which, in most practical cases, offers an invisible watermark capable of detecting any significant tampering of the image content, and immune to lossy compression schemes such as JPEG. The watermarking technique according to the invention is based on certain empirically verified attributes of an image property; e.g., average intensity value.

Assume an image plane consists of macroblocks, which are themselves made up of microblocks. In its preferred embodiment, a code is embedded that corresponds to the value of this image property in each macroblock, in spatial domain. The specific sequence of microblocks used for embedding this information in the watermarking image plane is a unique function of this property for the corresponding set of microblocks in the indexing image plane. This offers sensitivity to alterations as well as immunity from brute-force efforts for watermark extraction.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
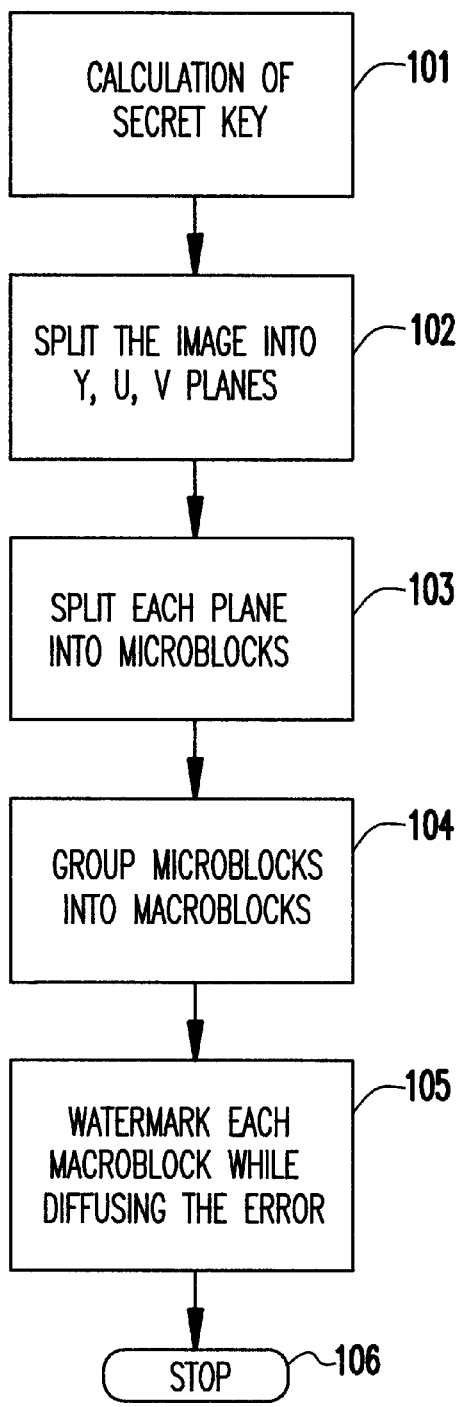
FIG. 1 is a flow diagram showing the process of embedding a watermark according to the invention.

The watermarking scheme of this invention is based on an image property that has the following attributes. The property in which we can embed the watermarking information is obtained from the image, or a portion of the image. The property should be such that the value obtained from the property before and after a lossy compression (like JPEG) does not change by a significant amount, and the change should be bounded. The value is some function of the property. For example, if the property is that the average value of some portion of the image survives compression to some precision, then the value could be the average value of that portion to the specific precision. As another example of selecting an image property, if it is determined that the texture of some portion of the image survives compression, then this information could be used as the basis for embedding information.

Furthermore, any malicious tampering attempt should result in a detectable change in the value associated with the image property. If we are able to obtain such a property, then the value of this property as obtained from the image will not vary due to JPEG compression but only due to malicious tampering. Thus, we only need to store this value obtained from the property so that at the time of verification, a comparison can be carried out and the image can be verified.

Now the question is how to store the value obtained from the property in a secure manner. When the value obtained from the property for a portion of the image is embedded into that portion of the image itself, the value obtained from the property can itself change during the process of storing the value. This error must be avoided. This issue is referred to as error avoidance. To avoid errors, the image can be broken into subparts and each part can be used to store some information. This information can be called the checksum in simple terms that uniquely represents that part of the image. The value range of the property is mapped to bits, and the bits are stored in sub-parts by manipulating the pixels to make the property lie in a certain range which, in turn, represents the required bit. While juggling with pixels in the sub-parts, care must be taken that the value of the property for a larger image part or the complete image, which is being stored, itself does not change.

In the following description, we use the terms defined below:

microblock: A block of m×n pixels.

macroblock: A group of m×n rectilinear microblocks.

tolerance: The allowed change in the average value of a microblock before and after compression.

erroneous blocks: The micro-blocks whose average value change exceeds the tolerance limit.

$\Delta/2$: The maximum amount by which the microblock average value is expected to change normally.

$\gamma/2$: The amount of change by which the microblock average value is never expected to exceed.

i: Index of the microblock selected from the free list. i is initialized to 1.

j: The number of microblocks already chosen in the $k^{th}$ macroblock. k is initialized to 0.

k: The macroblock presently under formation. k is initialized to 1 for the first macroblock.

M: The number of microblocks in a macroblock.

For example, the average value in the Y, U, V planes of a rectilinear polygon in the pixel array of the image can be used as the image property with attributes described above. It should be noted that neither the average value, nor the Y, U, V planes must be used. In general, any subdivision of the image, or a value other than the average value, can be used. The justification for the use of this property comes from the empirical observation obtained by experimenting with thousands of images. The average value of any m×n pixel block (where m and n are large) in any of the Y, U or V component planes after compression and decompression does not change by a significant amount in most of the blocks.

With reference now to the drawings, and more particularly to FIG. 1, the major steps involved in the watermarking of a digital image are as follows. A secret key is first calculated in function block 101. Then, in function block 102, the input image is split into the Y, U, V planes. Each plane is split into microblocks in function block 103, and then the microblocks are grouped into macroblocks in function block 104. Each macroblock is watermarked while diffusing the error in function block 105. The process stops at block 106.

Figure 2:
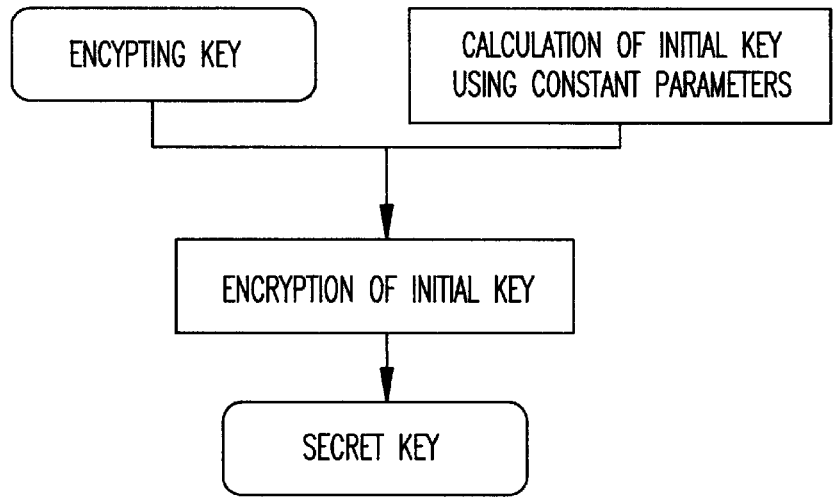
FIG. 2 is a flow diagram showing the logic of the process of calculation of a secret key called by the process of FIG. 1.

The calculation of the secret key called in function block 101 is shown in FIG. 2. An encrypting key is selected at 201. Now we calculate in function block 202 an initial key using image independent parameters, such as time of the day, photograph number, etc. Now using standard encryption, this key is encoded in function block 203 to form the secret key 204.

Figure 3:
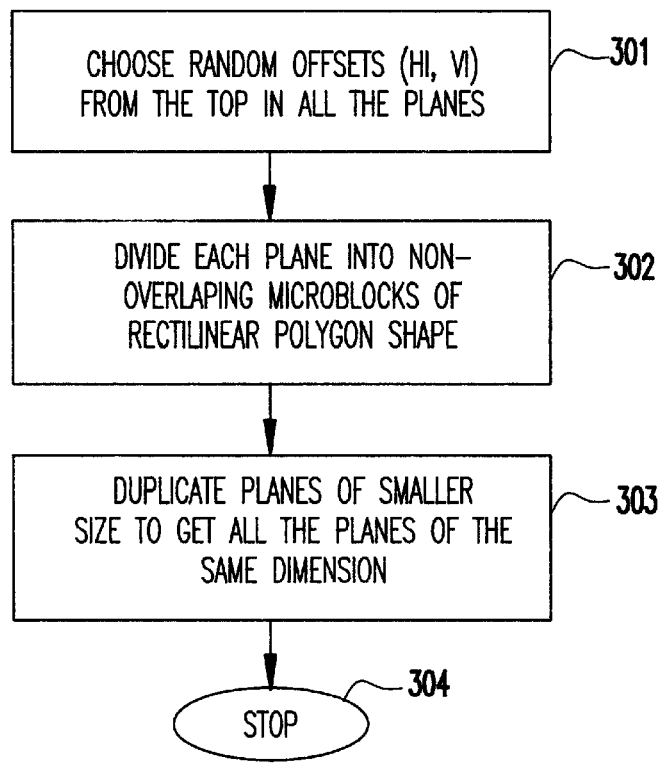
FIG. 3 is a flow diagram showing the process of the formation of microblocks.

The formation of microblocks (function block 103 in FIG. 1) is shown in FIG. 3. Using the secret key, an offset (hi,vi) is left at the top left corner in each of the planes in function block 301. In function block 302, each plane is divided into non-overlapping rectilinear polygons of size m×n pixels starting from top left corner of the planes. Now, the planes of smaller size are duplicated in function block 303 to get all the planes of the same dimension. The process stops at block 304.

Figure 4A:
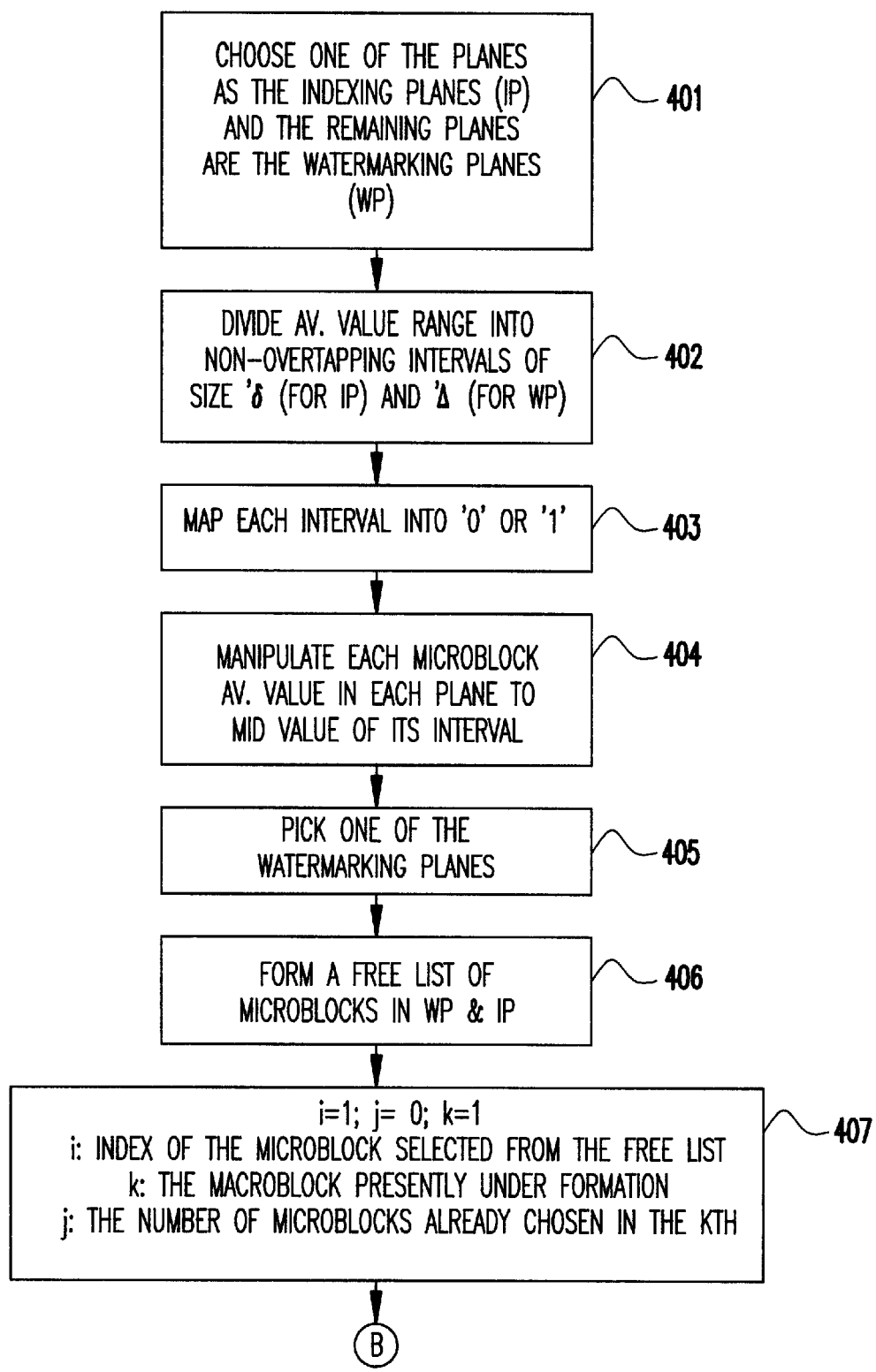
FIGS. 4A and 4B, taken together, is a flow diagram showing the logic of the indexed grouping process.

Now, the process of grouping these microblocks into macroblocks is described (function block 104 in FIG. 1). First with reference to FIGS. 4A and 4B, we explain the indexing scheme. In function block 401, an indexing plane (IP) is chosen based on the secret key. The remaining planes are the watermarking planes (WP). Based on the IP, we watermark each of the WPs. The average value range is divided into non-overlapping intervals of size substantially equal to $\Delta$ (for the IP) and substantially equal to $\gamma$ (for the WP) in function block 402. A function is constructed in function block 403 for mapping each interval in the WP into a bit 0 or 1 such that too many consecutive intervals do not map onto the same bit. The watermark value is a bit pattern where one bit is to be stored in each microblock. The 0/1 bit represents this data bit to be stored. For example, suppose 10 is to be stored into four microblocks. Now, 10=0101 in binary representation. These four bits are stored into the four microblocks by modifying the required property to make it map to the necessary bit. Suppose the value of a microblock is 100, and the functional mapping maps 100 to the 1 bit. If the 1 bit is stored in this microblock, the microblock value does not need to be modified. However, if 0 is stored, then the microblock value is modified so that its new value maps to bit 0. Also, consecutive intervals should not map onto the same bit because a change in the microblock value should be limited when the bit to be embedded is different from the bit that the original value maps to. This is essential in order to maintain the invisibility of the watermark.

Now, the average values of each microblock in each plane are manipulated in function block 404 to the mid value of its interval by suitably manipulating the pixel values in the microblock. For example, suppose a microblock has the following property value:

| 100 | 101 | 99  |
|-----|-----|-----|
| 102 | 103 | 104 |
| 99  | 101 | 100 | with an average value of 101. Suppose that the mid value of the corresponding interval is 100. Each pixel is then decreased by 1 so that the new average value equals 100.

| 99  | 100 | 98  |
|-----|-----|-----|
| 101 | 102 | 103 |
| 98  | 100 | 99  |

Note that the above example uses the average value, although any other function (e.g., maximum value, minimum value, etc.) could also have been used.

One of the WPs is picked in function block 405. Now, a free list of microblocks in the WP and the IP is formed in function block 406. The free list is a list of microblocks that have not been included in a macroblock. It has been experimentally observed that erroneous microblocks (i.e., a microblock in which the change in the property value, due to compression, exceeds the tolerance limit) tend to occur in clusters. Hence, the free list is formed in such a manner that consecutive microblocks do not occur simultaneously in the free list. Before entering the recursive processing loop shown in FIG. 4B, the previously defined index parameters i, j and k are initialized to i=1, j=0, and k=1 in function block 407.

The free list is broken down into groups of M microblocks. A macroblock is comprised of M microblocks. In a preferred embodiment, this grouping is done on the basis of the average values of microblocks in the indexing plane, although other values (e.g., maximum or minimum) can also be used. The average value of each microblock in the IP is used for creating the microblock sequence in the WP. This sequence is subsequently used for embedding the average value of the corresponding macroblock. Microblocks in the free lists of WP and IP in the same position are said to be in one-to-one correspondence.

Figure 4B:
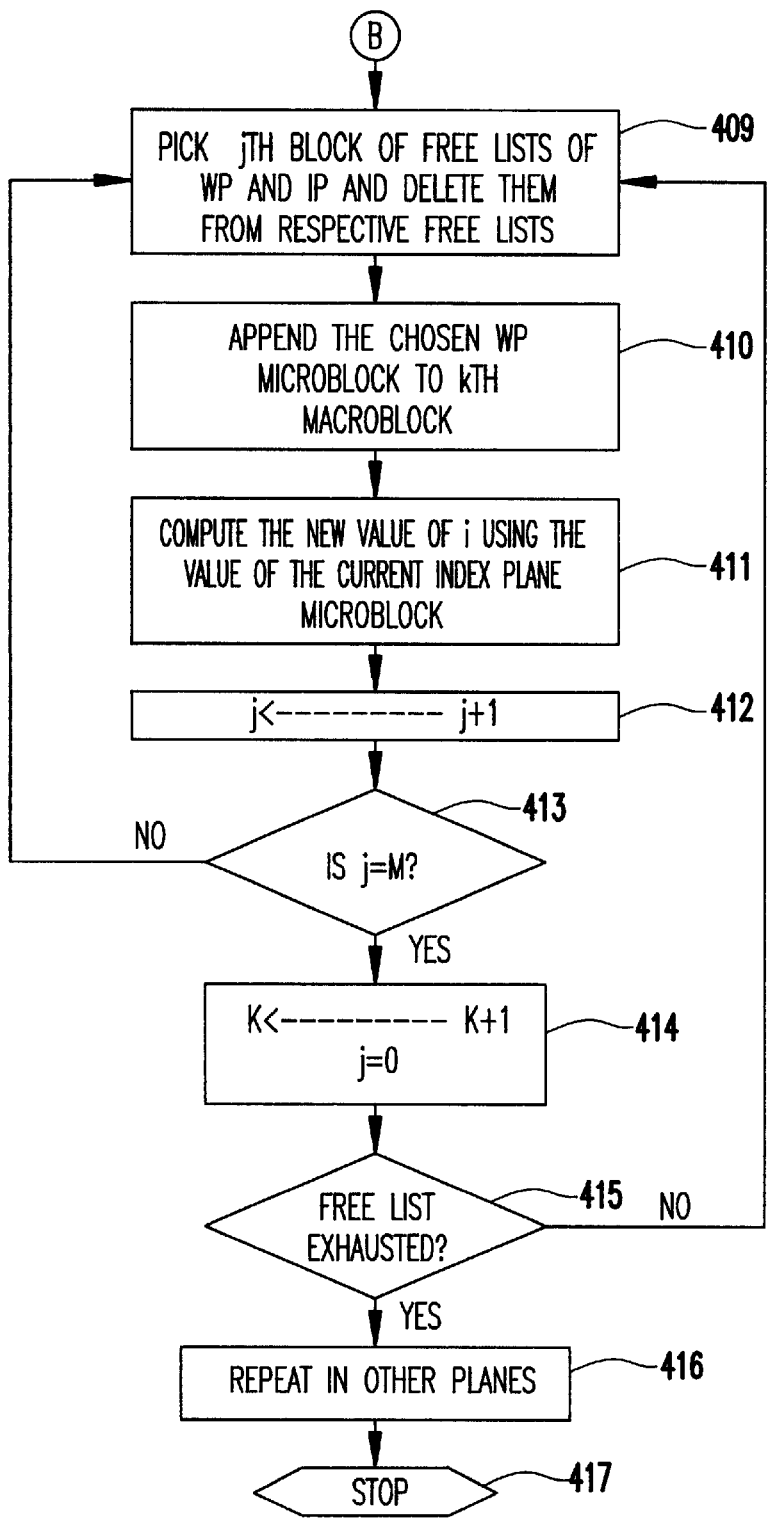

The processing loop begins with function block 409 in FIG. 4B. Suppose we start grouping microblocks of the WP from the $i^{th}$ microblock in the free list. We look at the average value of the corresponding microblock in the IP. This value determines the next microblock in the WP to be grouped with the $i^{th}$ microblock. Also, once we have grouped microblocks, the grouped microblocks are deleted from the free list. The chosen WP microblock is appended to the $k^{th}$ macroblock in function block 410. Then, the new value of i is computed using the value of the current index plane macroblock in function block 411. For example, a quotient function may be used. Suppose the current microblock value is 100 and dividing by 7 is used. Then the next microblock chosen would be the $14^{th}$ (100 div 7) block following the current block.

In function block 412, j, representing the number of microblocks chosen in the $k^{th}$ macroblock, is incremented. This process is repeated until no more microblocks can be grouped into a macroblock, as determined in decision block 413. Then, in function block 414, k, the macroblock presently under formation, is incremented to indicate that we are using a new macroblock, and j set to zero. A test is made in decision block 415 to determine if the free list is exhausted. If not, the process loops back to function block 409; otherwise, the same procedure is then repeated for the other WP, as indicated by function block 416. The process stops at block 417. The starting point of grouping for both the WPs are chosen depending on the value of the secret key.

Figure 5A:
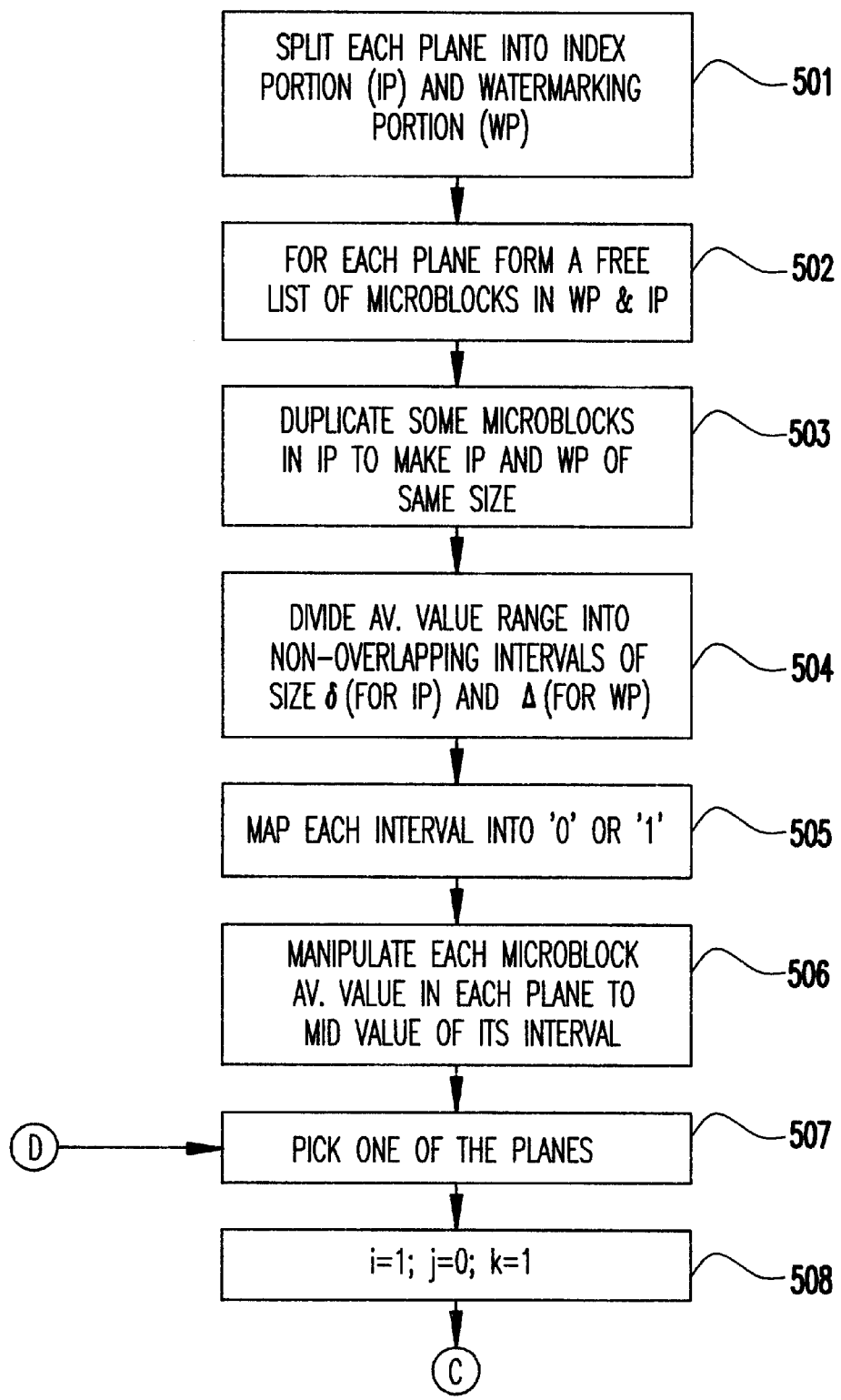
FIGS. 5A and 5B, taken together, is a flow diagram showing the logic of the self-indexed grouping process.
Figure 5B:
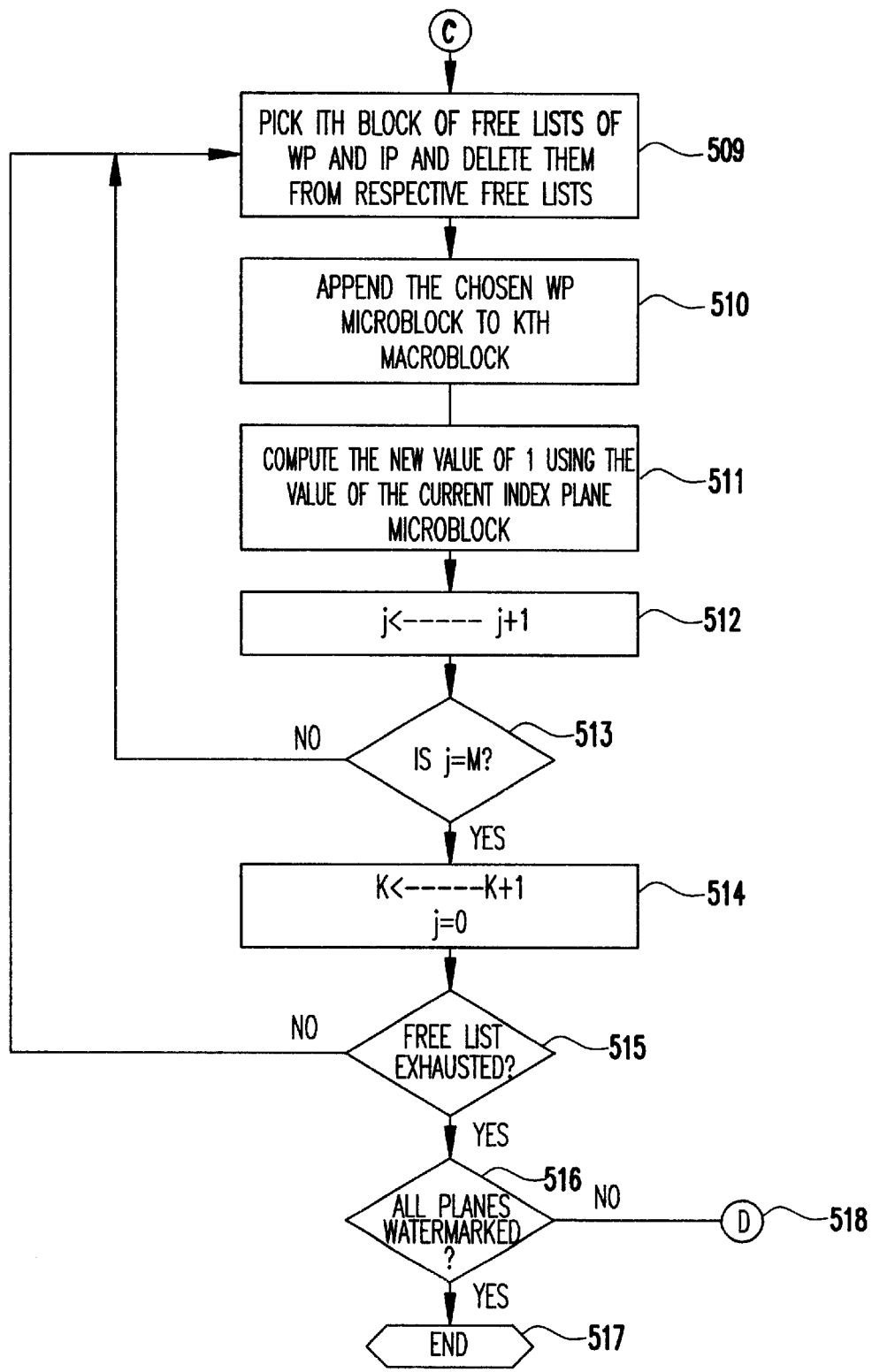

In another embodiment, illustrated in FIGS. 5A and 5B, we do not use an explicit plane as an IP but instead split each plane into an index portion (IP) and watermarked portion (WP), as shown in function block 501. This splitting is again done on the basis of the secret key. For example, we have a function which, using the secret key, decides whether a microblock is to be kept in the WP or the IP. Any function can be used and the current microblocks in the WP or the IP do not need to be spatially close to one another. Note that care must be taken while splitting to ensure that the IP is not larger than WP and that their sizes are approximately the same. Note that if a tamperer tried to modify blocks which belong to the IP, then the microblocks in the WP would be wrongly grouped at the verification stage and the tampering would be detected. This is the mechanism by which security of the IP is ensured. If the size of the IP is greater than the WP, all of the microblocks of the IP would not be utilized, thus leaving them exposed to the tamperer. Thus, the IP should be less than or equal to the size of the WP. Once each plane is split into an IP and a WP, in block 502 a free list of microblocks is formed in the WP and the IP parts of each plane.

In block 503, some of the microblocks are duplicated in the IP to make the IP and the WP substantially the same size. In block 504, the average value range is divided into non-overlapping intervals of size $\Delta$ (for the IP) and $\Delta$ (for the WP). Each interval is mapped into "0" or "1" in function block 505, and then the average value of each microblock in each plane is manipulated to the mid value of its interval in function block 506. One of the planes is selected in function block 507 for both the IP and the WP. Before entering the recursive processing loop shown in FIG. 5B, the previously defined index parameters i, j and k are initialized to i=1, j=0, and k=1 in function block 508.

The free list is broken down into groups of M microblocks. A macroblock is comprised of M microblocks. Specifically, the processing loop begins with function block 509 in FIG. 5B, where we pick the $i^{th}$ block of free lists from the IP and the WP, and subsequently delete them from the respective free lists. The chosen WP microblock is appended to the $k^{th}$ macroblock in function block 510. Then, the new value of i, the index of the microblock selected from the free list, is computed using the value of the current index plane macroblock in function block 511. In function block 512, j, the number of microblocks in the $k^{th}$ macroblock, is incremented. This process is repeated until no more microblocks can be grouped into a macroblock, as determined in decision block 513. Then, in function block 514, k is incremented to indicate that we are using a new macroblock, and j set to zero. A test is made in decision block 515 to determine if the free list is exhausted. If not, the process loops back to function block 509; otherwise, a test is made to determine if all planes are watermarked, as indicated by function block 516. If all the planes are watermarked, the process ends in function block 517. If all planes are not watermarked, one of the planes is selected in function block 507, as indicated by block 518. The starting point of grouping for both the WPs are chosen depending on the value of the secret key. This embodiment is referred to as the self-indexing scheme.

Figure 6A:
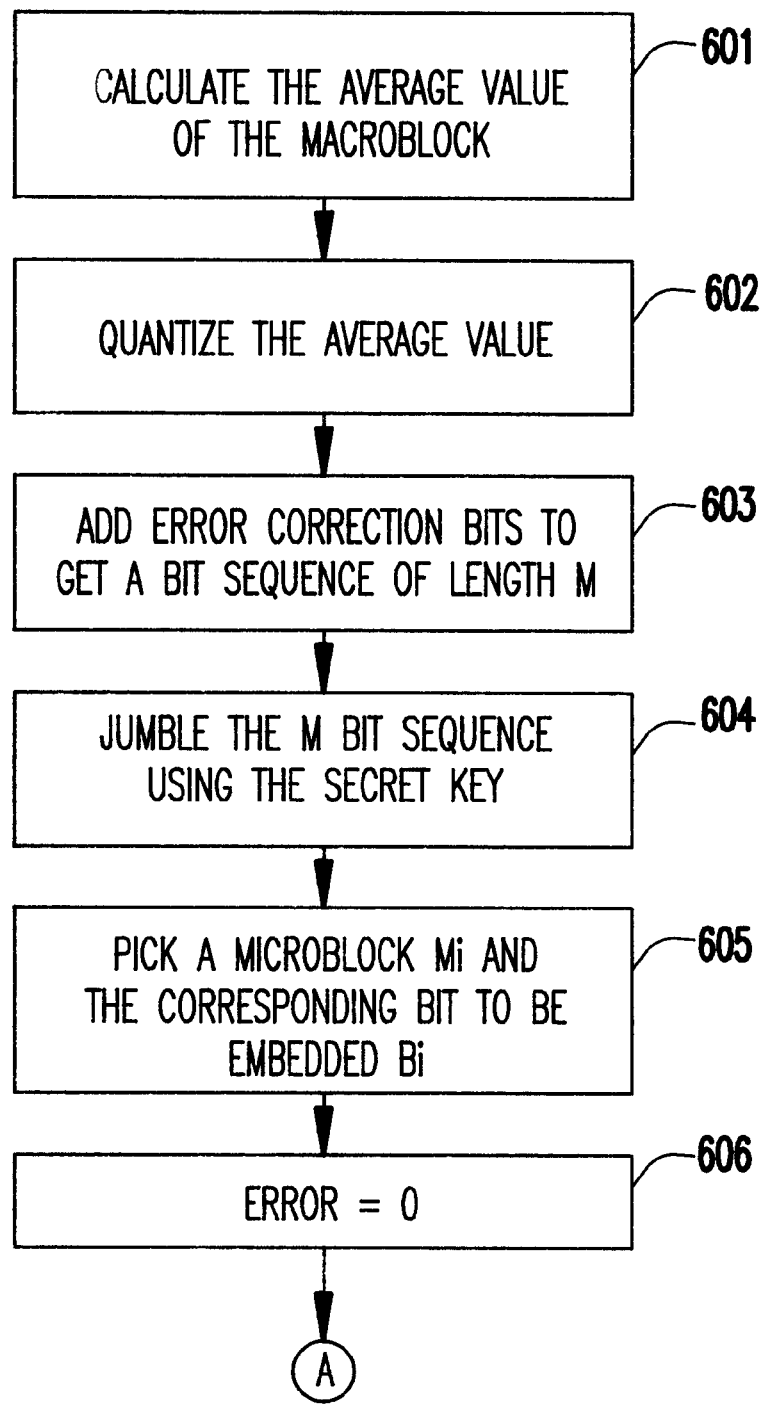
FIGS. 6A and 6B, taken together, is a flow diagram showing the logic of information embedding in a macroblock.
Figure 6B:
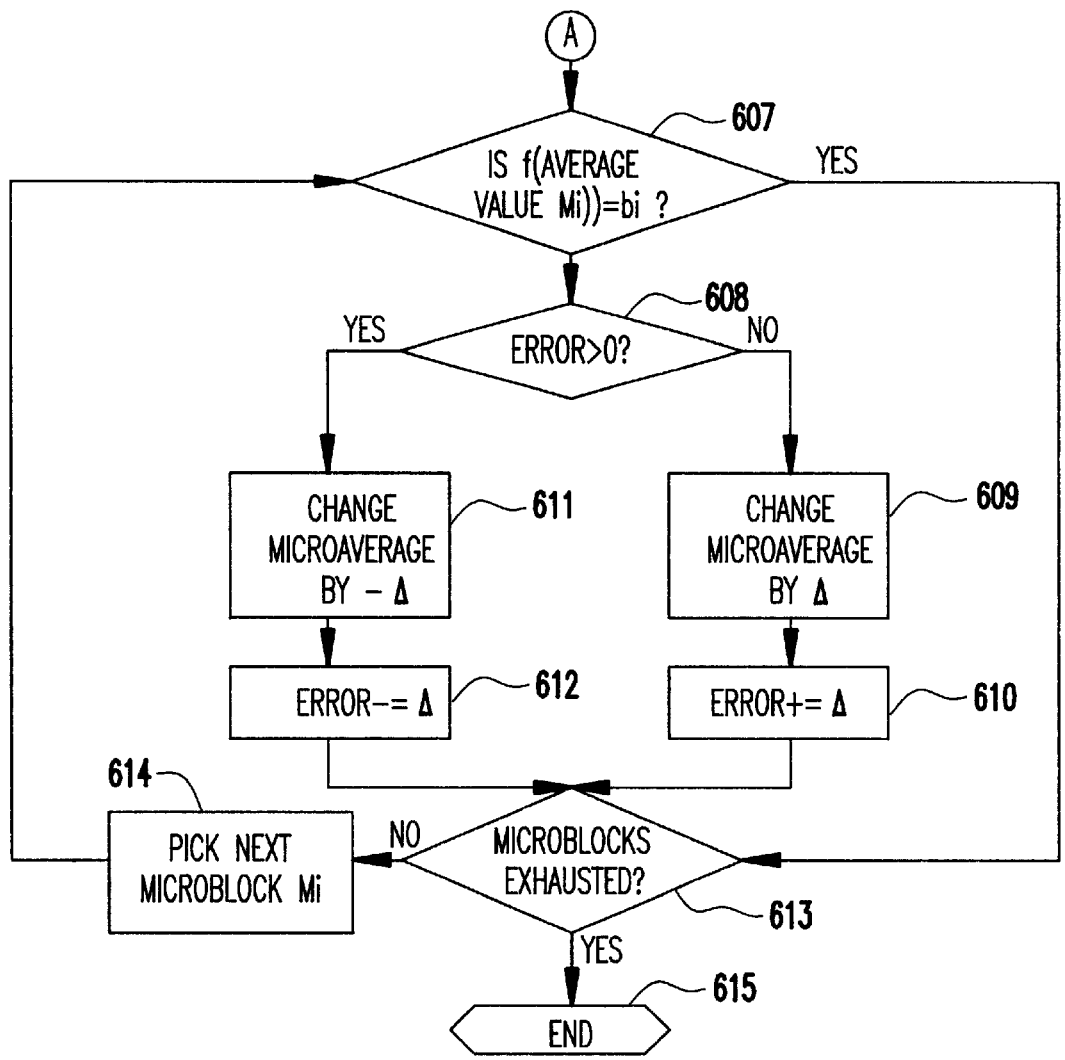

The process of embedding information in a macroblock (function block 105 in FIG. 1) is shown in FIGS. 6A and 6B. Once we have grouped the microblocks into macroblocks, then for each macroblock we calculate the average value of the macroblock in function block 601. The calculated average value is quantized and represented in binary form in function block 602 and, in function block 603, a suitable number of redundant bits are added using any error redundancy code to get M bits. Redundant bits are those that are added to the property value for error recovery from compression. There is a small possibility that the change in the property value of the microblock, because of compression, may exceed its tolerance value. Hence, there could be a problem at the verification stage as the bit extracted from this changed microblock would differ from the embedded one. Thus, to recover the actual embedded value, error recovery bits are added. Note that security is decreased if a very large number of redundant bits are used. This is because any changes made by a tamperer could then be overlooked by the verification scheme. These M bits are then encrypted in function block 604 based on the secret key. Now one bit is stored into each one of the M microblocks that form a macroblock in function block 605. This is done using the mapping function $f$ which maps average values of microblocks to a bit; i.e., 0 or 1. Before entering the recursive processing loop shown in FIG. 6B, the error is set to zero in function block 606.

The error diffusion scheme is shown in FIG. 6B, the microblock average values are checked in function block 607 to see as to which bit they inherently represent. The bit inherently represented in the microblock is the one given by the functional mapping of the property value of the microblock. If this bit is the same as the bit to be embedded, then we do not modify the microblock; otherwise, we change the microblock average value by $\Delta$ or $-\Delta$. Whether we increase or decrease by $\Delta$ depends on a net error value which has so far been introduced as determined in function block 608. Initially, the error value is zero, and if we increase a microblock by Δ, error also increases by Δ, as shown by function blocks 609 and 610, and vice versa, as shown by function blocks 611 and 612. We increase a microblock average value by Δ if we need to change the embedded bit and the net error value is negative, and vice versa. Thus, at the end when we have embedded the bits into the M microblocks, the net error value should be close to zero so that the stored average value and actual average value do not differ. A test is made in decision block 613 to determine if all microblocks have been processed. If not, the next microblock is picked in function block 614, and the process begins again at function block 607. The process ends at block 615.

Figure 7A:
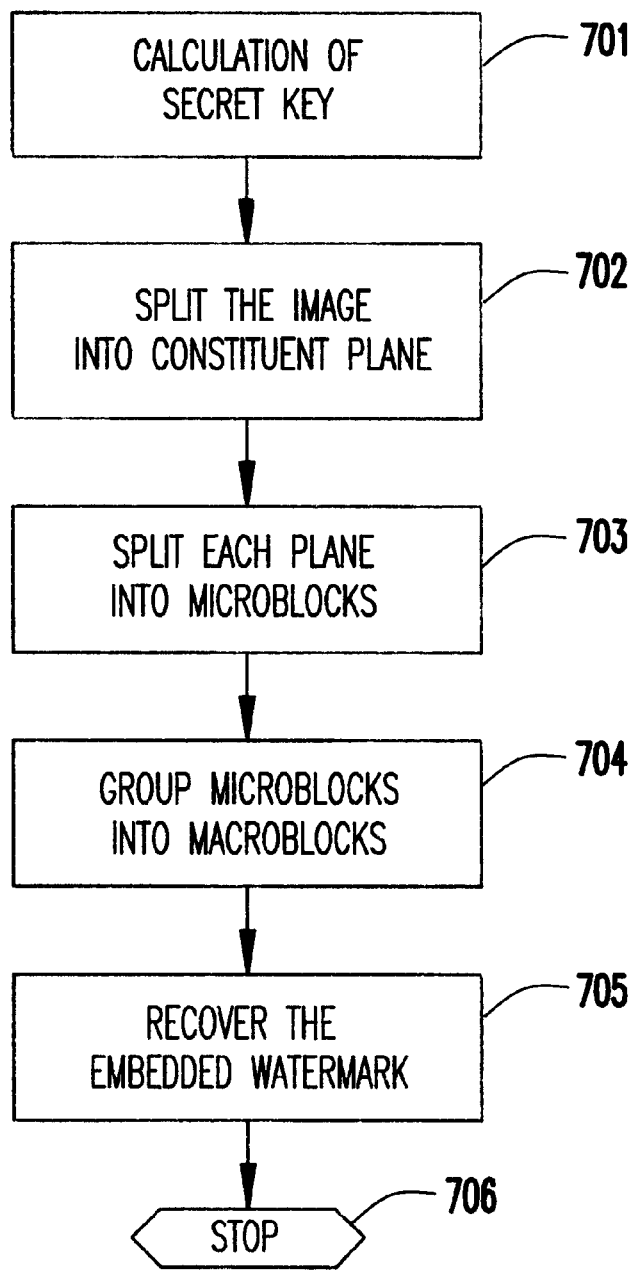
FIGS. 7A and 7B, taken together, is a flow diagram showing the process of extracting a watermark.
Figure 7B:
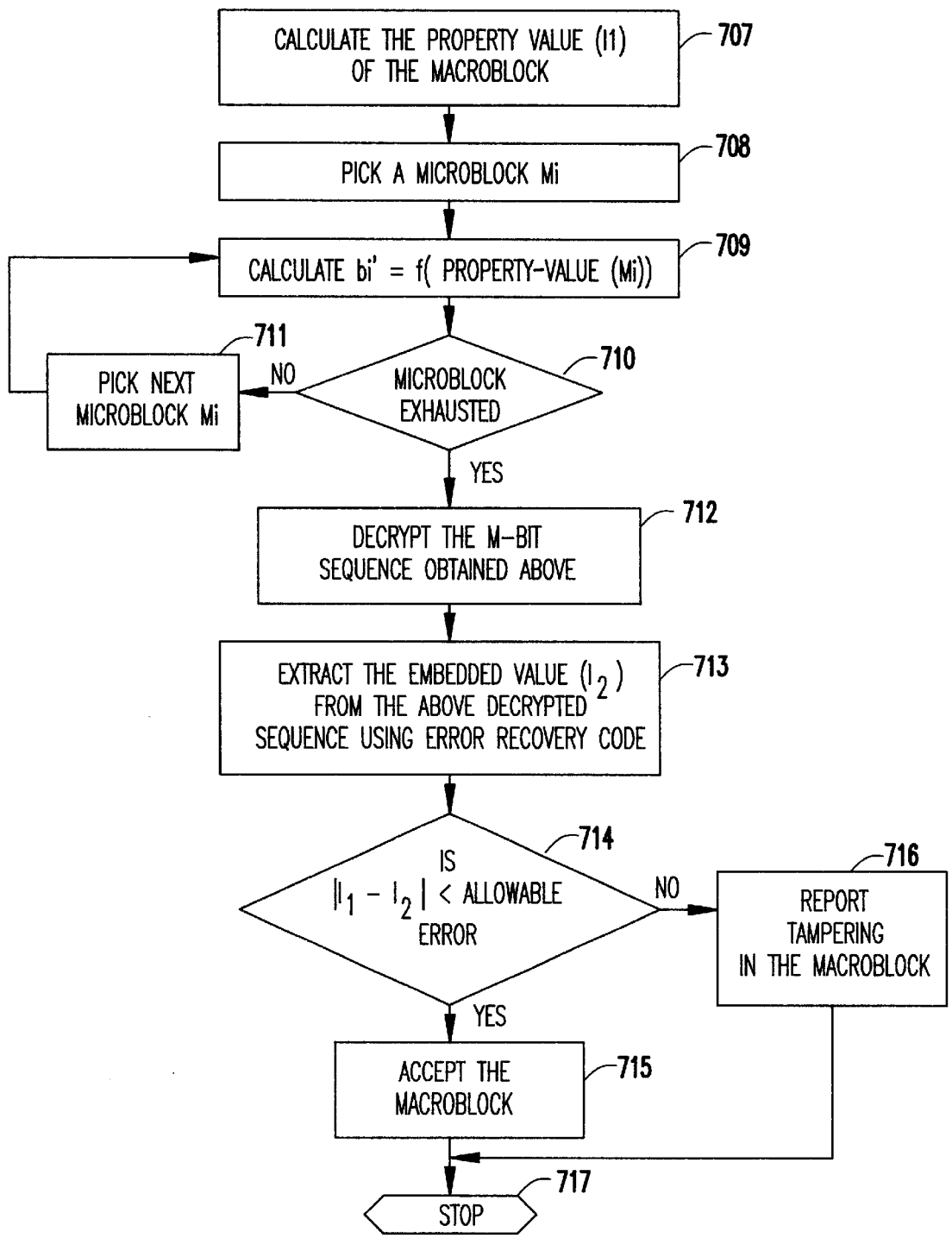

The process of extracting the watermark from the digital image is shown in FIGS. 7A and 7B. A secret key is first calculated in function block 701. Then, in function block 702, the input image is split into the constituent Y, U, V planes. Each plane is split into microblocks in function block 703, and then the microblocks are grouped into macroblocks in function block 704. The watermark embedded within each macroblock is recovered in function block 705. The process then stops at function block 706.

Now, the process of recovering the embedded watermark is described (function block 705 in FIG. 7A). The processing loop begins with function block 707 in FIG. 7B, where the property value $I_1$ of the macroblock is calculated. Property value $I_1$ is a binary sequence of length M. Next, a microblock $M_i$ is chosen in function block 708. In function block 709, the bit $b_i'$ that the microblock inherently represents is calculated. In function block 710, a check is made to determine if all the microblocks are exhausted. If additional microblocks remain, the next microblock is chosen in function block 711. The bit $b_i'$ that the new microblock inherently represents is calculated in function block 709. If the test in function block 710 yields that no more microblocks remain, the M-bit sequence is decrypted in function block 712. Next, in function block 713, the embedded value $I_2$ is extracted from the M-bit sequence using error recovery code.

In function block 714, a test is made to determine if the absolute value between the difference between the property value $I_1$ of the macroblock and the embedded value $I_2$ is less than or equal to an allowable error η. The macroblock is accepted in function block 715 if the absolute value of the difference between the property value $I_1$ of the macroblock and the embedded value $I_2$ is less than or equal to an allowable error η. If the absolute value of the difference between the property value $I_1$ of the macroblock and the embedded value $I_2$ is greater than an allowable error η, an indication that the macroblock has been tampered with is reported in function block 716. The process terminates at function block 717.

For example, if the property of the macroblock $I_1=40$, the embedded property value $I_2=43$, and the allowable error value η=2, tampering would be reported since $|40-43|>2$.

In the following, we report experimental results. The default values of the parameters of our empirical observations, unless otherwise stated, are:

Image Plane: Y

Number of Bits per Pixel: 24

Image Resolution: 256×384

Microblock size: 10×10

Tolerance limit: 1.5

Table 1 gives the number of microblocks undergoing a change of at most X in their average value before and after compression for X in [0,1]. This clearly shows that the average value of a microblock in any of the Y, U or V component planes does not change by a significant amount in most of the cases.

TABLE 1

| Change in Microblock Average Value (X) | Percentage of Microblocks having change ≦ X |
|---|---|
| 0.1 | 16.4854700 |
| 0.2 | 31.2634400 |
| 0.3 | 44.4821100 |
| 0.4 | 56.8142100 |
| 0.5 | 68.0773000 |
| 0.6 | 76.5391200 |
| 0.7 | 83.6557500 |
| 0.8 | 88.8355400 |
| 0.9 | 92.7957800 |
| 1.0 | 96.1199900 |
| 1.1 | 97.7660230 |
| 1.2 | 98.7784790 |
| 1.3 | 99.3311810 |
| 1.4 | 99.6489007 |
| 1.5 | 99.8166551 |
| 2.0 | 99.9737078 |

Figure 8:
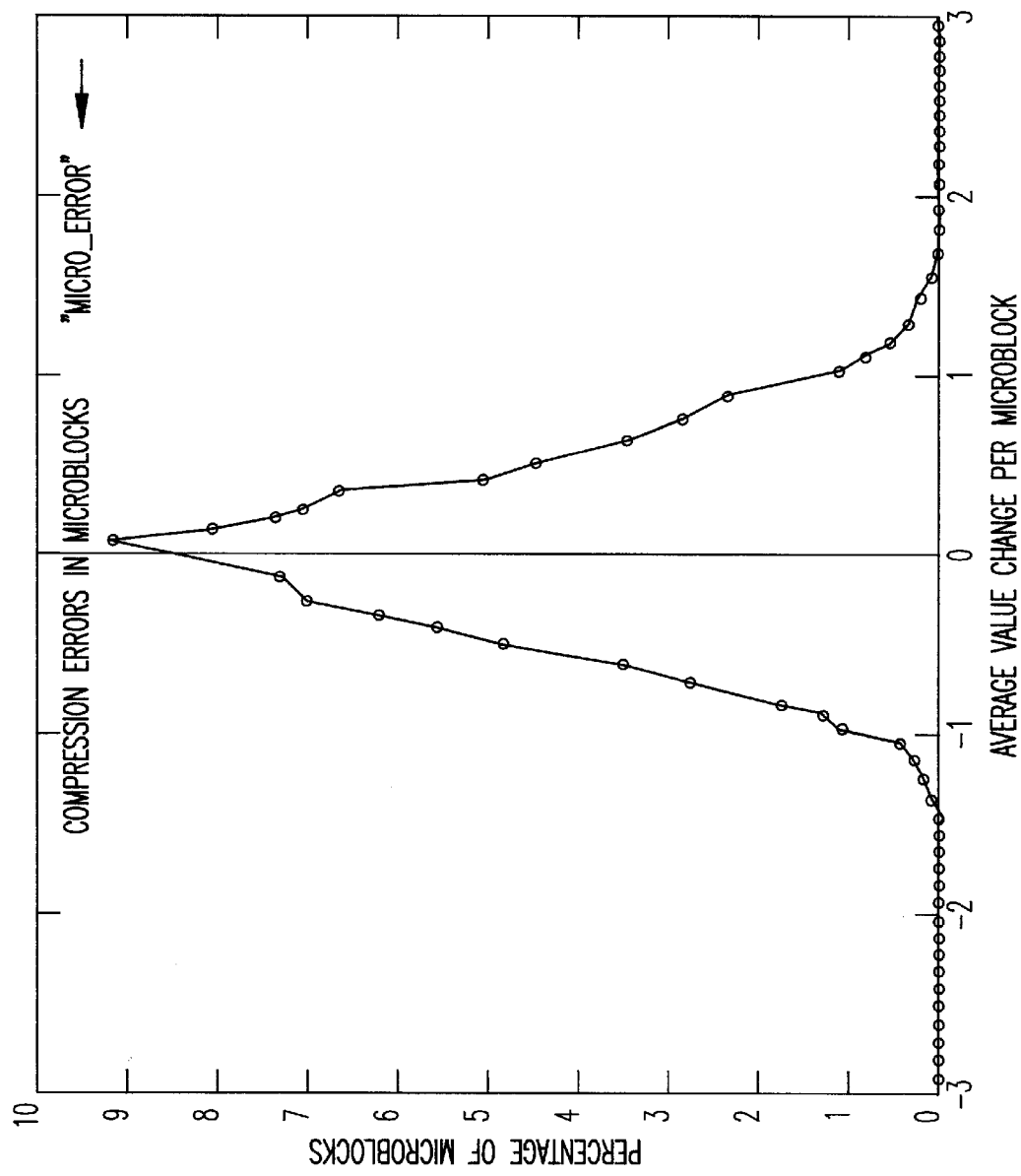
FIG. 8 is a graph showing the average value change per microblock versus the percent of total microblocks.

The above mentioned observation is also made clear by the graph of FIG. 8 where we plot the average value change per microblock along the x axis versus the percent of total microblocks. It is clear from the graph that almost none of the microblocks had average values changed by more than ±1.5. This graph clearly justifies the use of the above mentioned property.

Table 2 gives the percentage of images having the fraction of erroneous blocks at most X. This table reiterates the fact that most of the images had a very small fraction of microblocks in error.

TABLE 2

| Fraction of erroneous Microblocks (X) | Percentage of images having error ≦ X |
|---|---|
| 0.000 | 48.0 |
| 0.005 | 86.7 |
| 0.010 | 93.1 |
| 0.015 | 96.0 |
| 0.020 | 97.3 |
| 0.025 | 98.0 |
| 0.030 | 99.1 |
| 0.035 | 99.3 |
| 0.040 | 99.5 |
| 0.045 | 99.6 |
| 0.050 | 99.7 |
| 0.055 | 99.7 |
| 0.060 | 99.8 |
| 0.070 | 100.0 |

Figure 9:
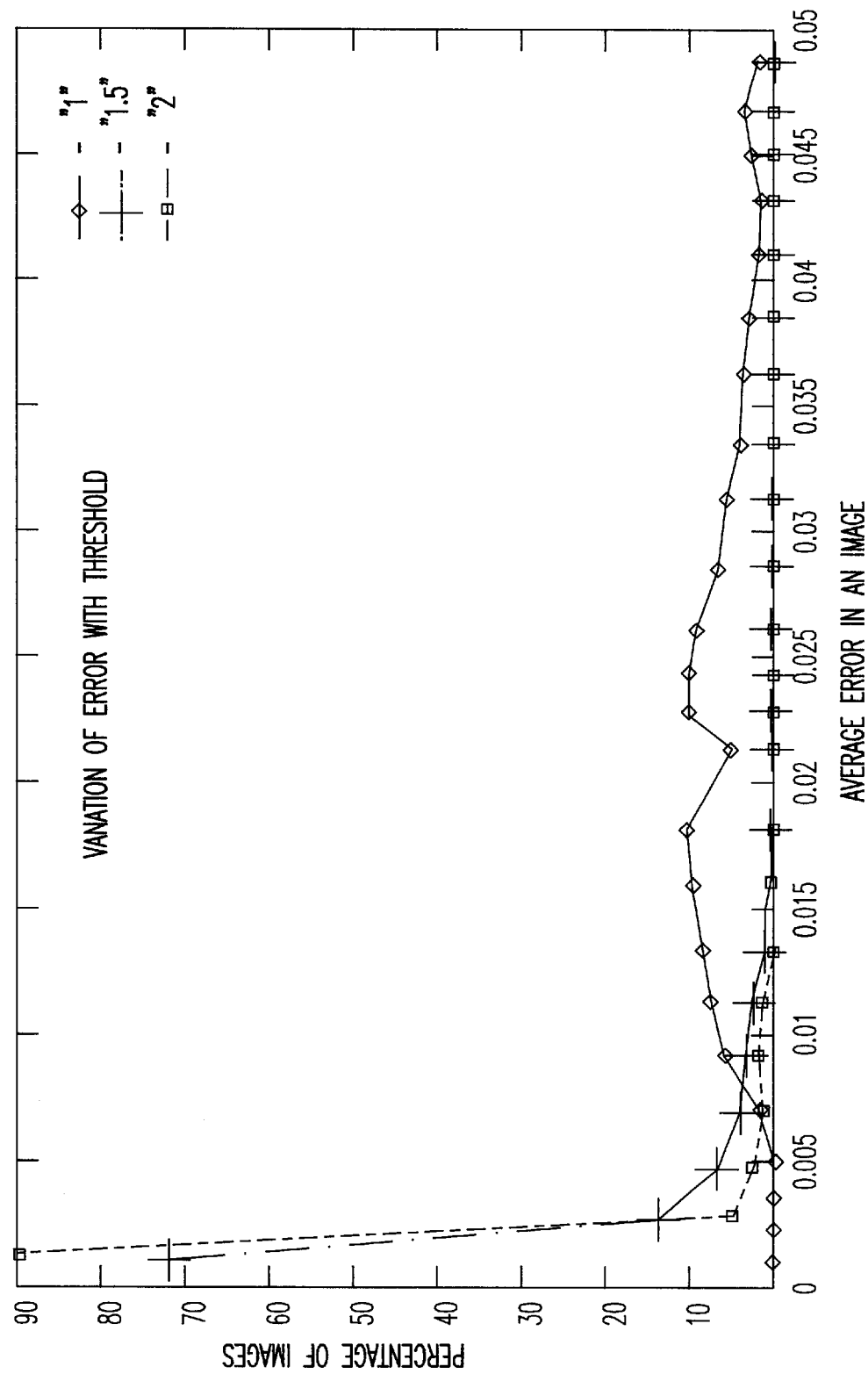
FIG. 9 is a graph comparing the frequency of erroneous blocks in an image with different tolerances used.

The graph of FIG. 9 compares the frequency of erroneous blocks in an image with different tolerances used. It is obvious that as the tolerance is increased, the number of erroneous blocks in an image goes down. This property has been tested under diverse conditions and the results obtained are tabulated in Table 3.

TABLE 3

| Tolerance Level | Percentage of erroneous blocks |
|---|---|
| 1.0 | 3.0175 |
| 1.5 | 0.2556 |
| 2.0 | 0.0762 |
| 3.0 | 0.0098 |

Figure 10:
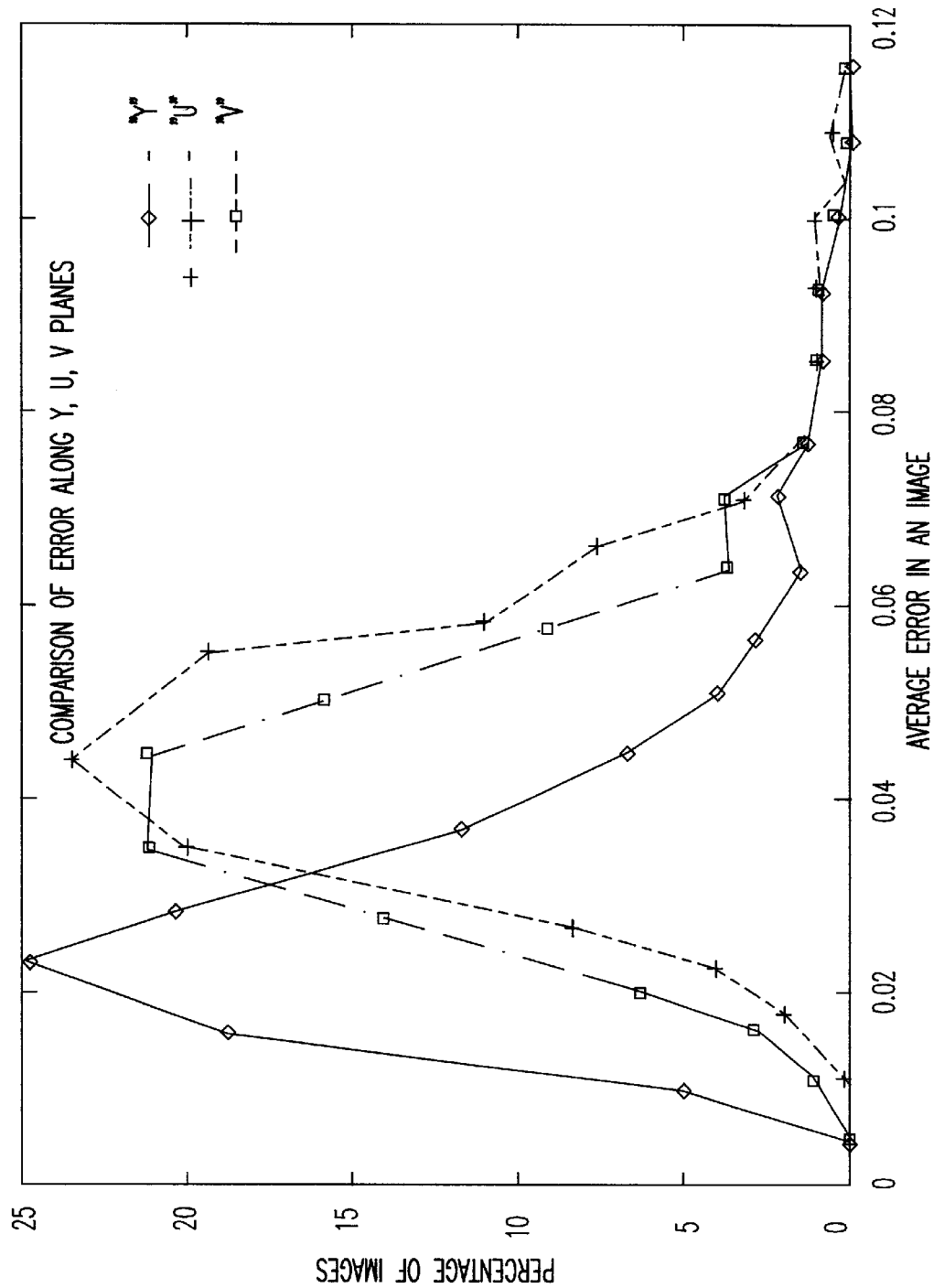
FIG. 10 is a graph comparing different Y, U, V planes under standard conditions.

FIG. 10 is a graph that compares the different Y, U, V planes under standard conditions. It is clear from the graph the property holds even more stringently in the Y plane. This can be explained from the fact that the human eye is more sensitive to the brightness stored in the Y plane. Table 4 shows this.

TABLE 4

| Plane | Percentage of erroneous blocks |
|---|---|
| Y | 3.0175 |
| U | 4.4697 |
| V | 4.1550 |

Figure 11:
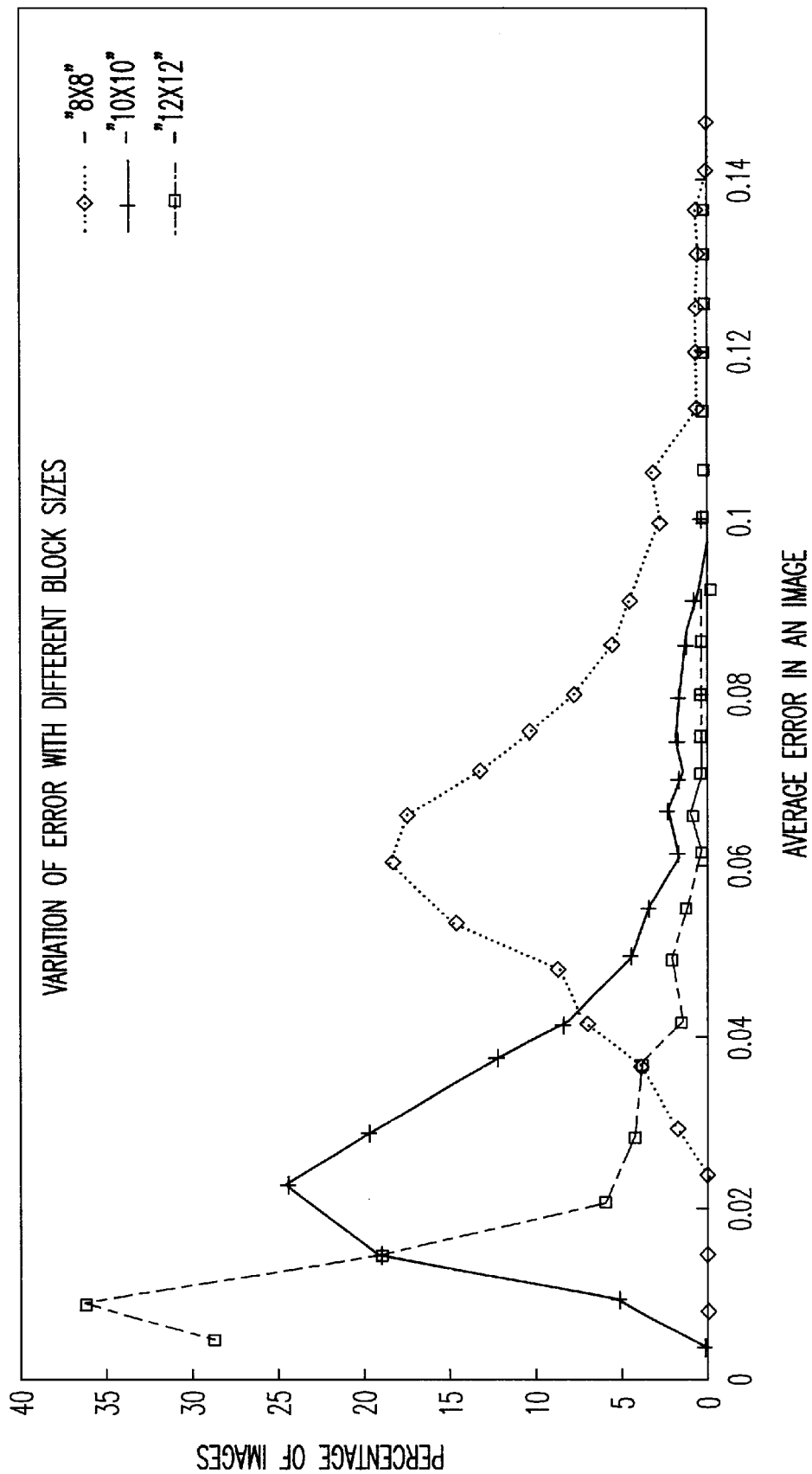
FIG. 11 is a graph comparing results for different sizes of microblocks.

FIG. 11 is a graph that compares that compares the results for different sizes of microblocks. It is observed that as the microblock size increases, the average number of erroneous microblocks goes down. Table 5 illustrates this.

TABLE 5

| Dimension of Microblock | Percentage of erroneous blocks |
|---|---|
| 12 × 12 | 1.4089 |
| 10 × 10 | 3.0175 |
| 8 × 8 | 6.7568 |

Figure 12:
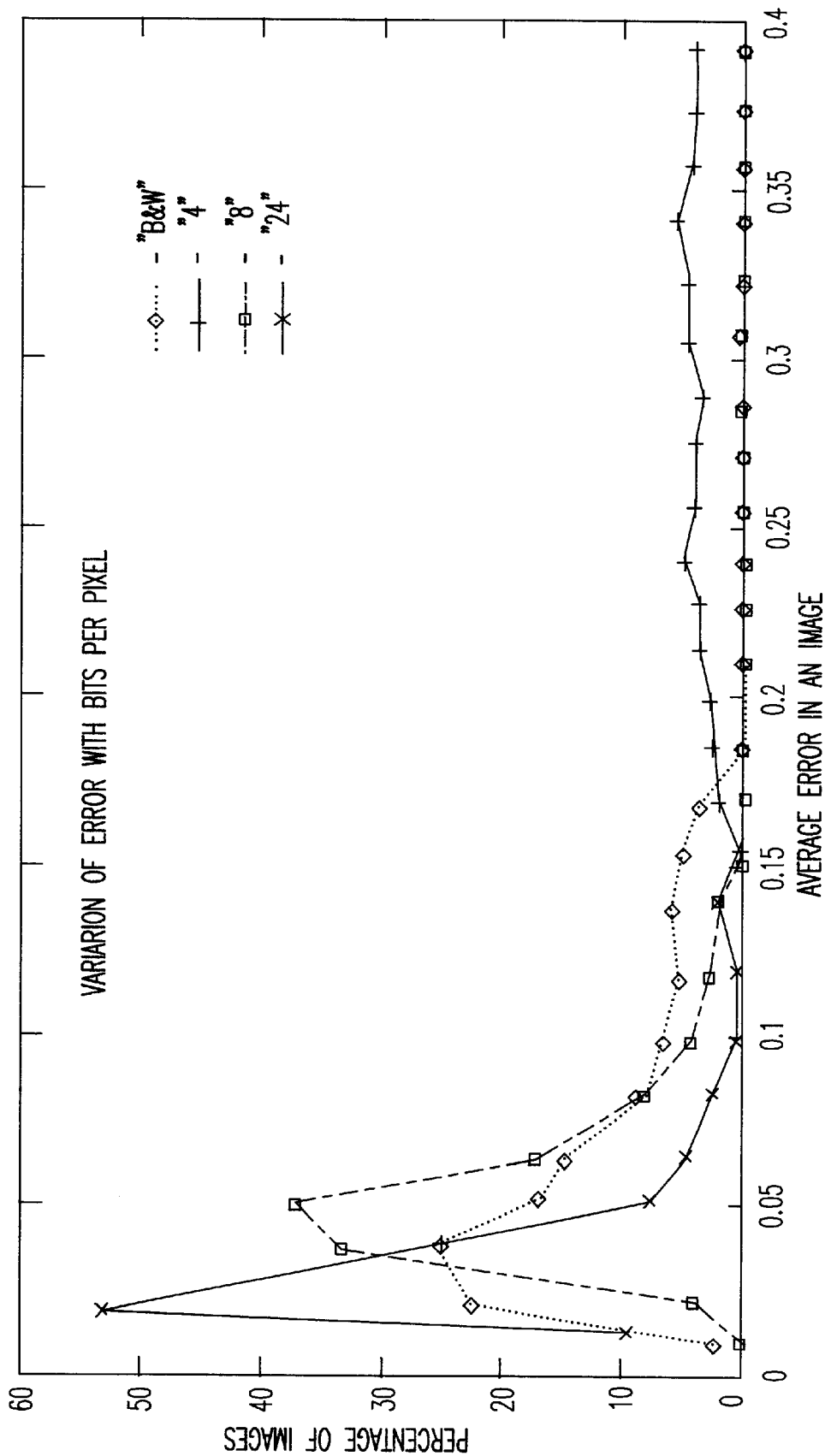
FIG. 12 is a graph comparing the results for images with different number of bits per pixel.

FIG. 12 is a graph which compares the results for images with different number of bits per pixel. It is observed that as the number of bits per pixel go down, the number of erroneous microblocks in an image goes up. This is explained from the fact that as we lessen the number of bits per pixel, the information loss in the image starts increasing and, thus, the average value begins to get modified by large amounts. Table 6 illustrates this.

TABLE 6

| Bits per pixel | Percentage of erroneous blocks |
|---|---|
| 24 | 3.0175 |
| 8 | 5.3758 |
| 4 | 45.7214 |
| 8(B/W) | 5.6141 |

Figure 13:
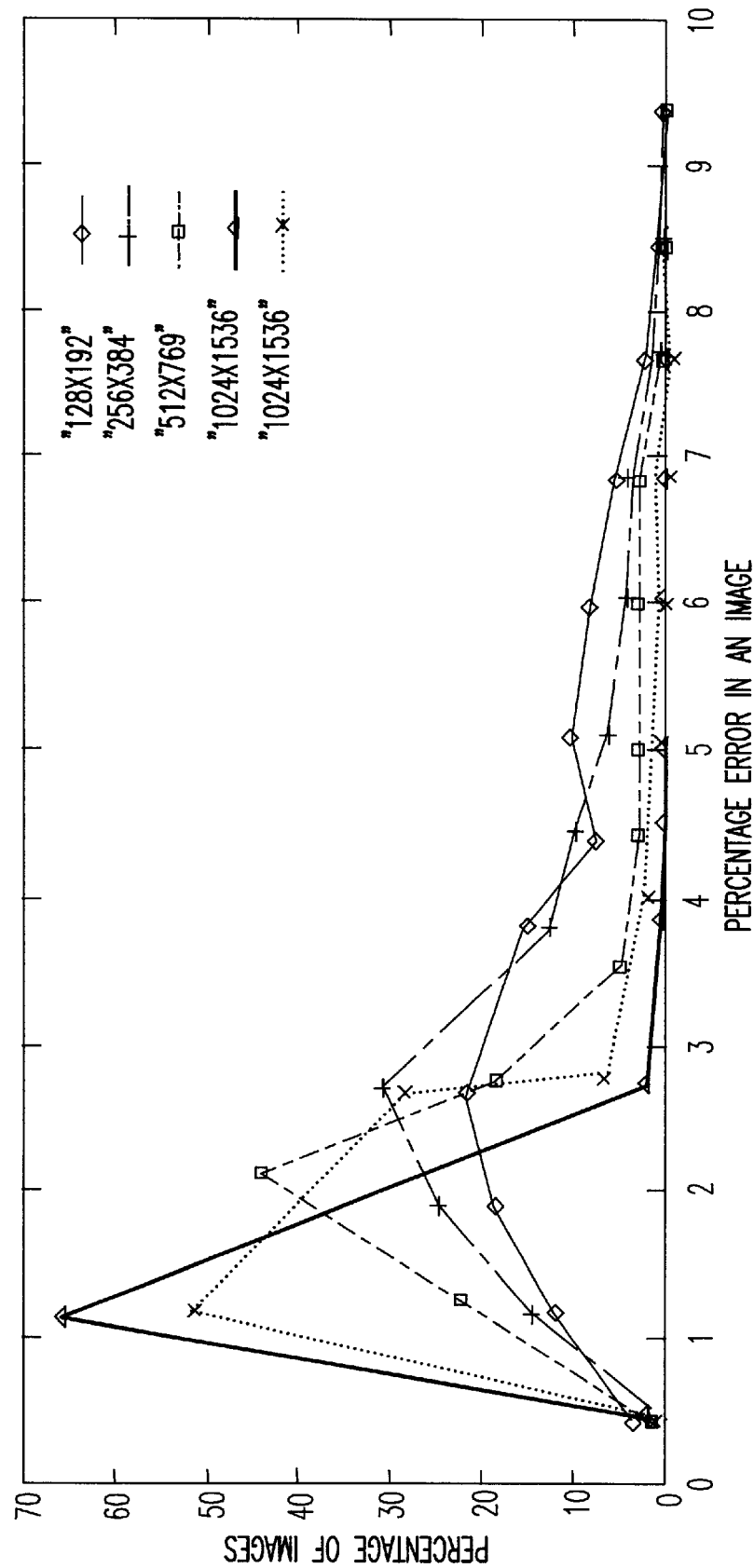
FIG. 13 is a graph comparing the results for different image resolutions.

FIG. 13 is a graph that compares the results for different image resolutions. It is observed that as the resolution of the image increases, the average number of erroneous blocks in an image goes down. This behavior is expected because of the information loss in the image as the resolution decreases. Table 7 illustrates this.

TABLE 7

| Resolution of Image | Percentage of erroneous blocks |
|---|---|
| 128 × 192 | 3.5961 |
| 256 × 384 | 3.0175 |
| 512 × 768 | 2.3674 |
| 1024 × 1536 | 1.6904 |
| 2048 × 3072 | 1.5088 |

Figure 14:
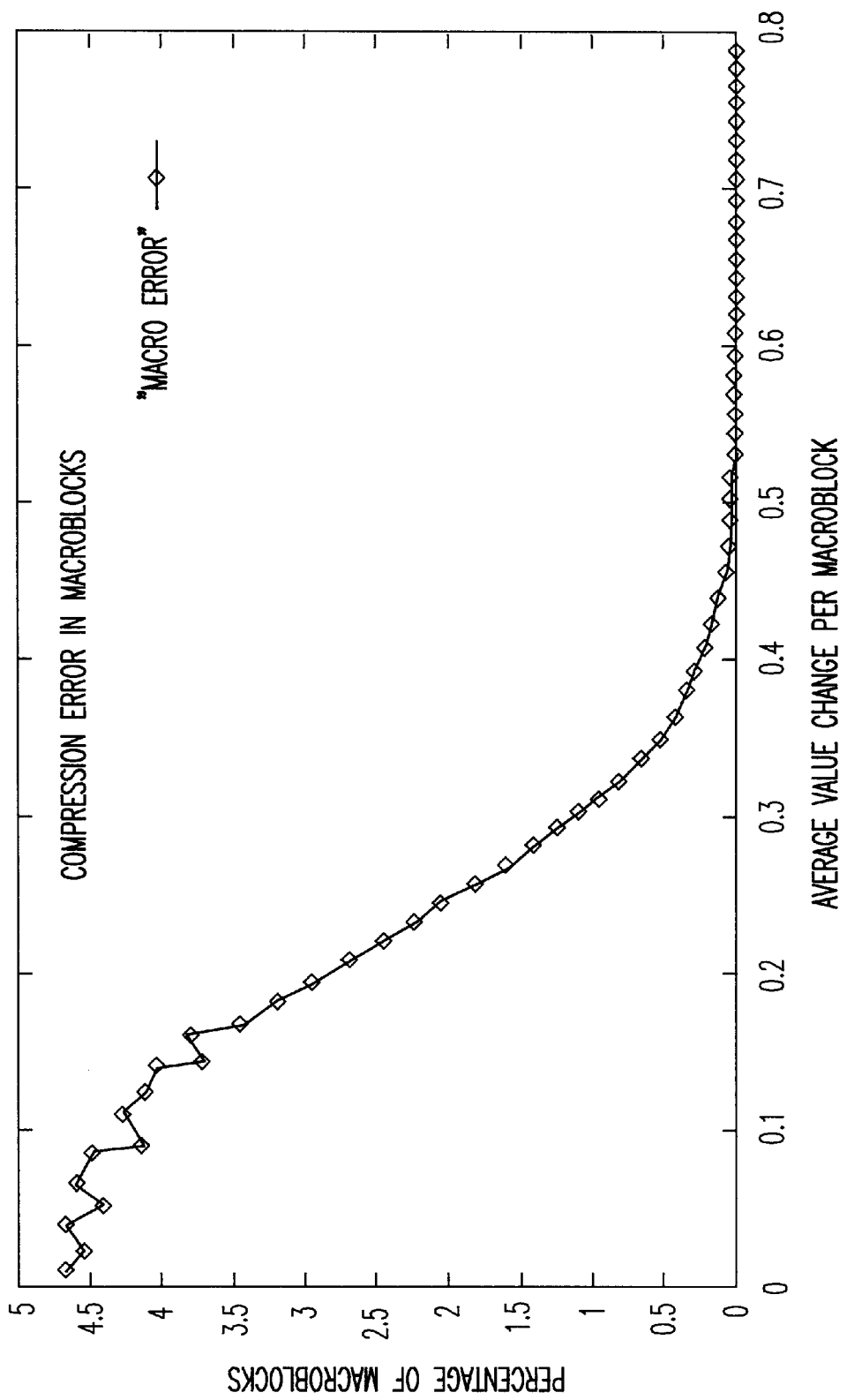
FIG. 14 is a graph showing the value change per macroblock versus percent of total macroblocks.

FIG. 14 is a graph in which we plot average value change per macroblock versus percent of total macroblocks. It is clear from the graph that almost none of the macroblocks had average value changed by more than ±0.5. Hence, at verification stage, we must allow a change of 0.5 in the average value of the macroblock.

Table 8 gives the percentage of macroblocks undergoing a change of at most X in their average value. This table shows that the macroblock average value changes are bounded.

TABLE 8

| Change in Macro Average Value (X) | Percentage of Macroblocks having change ≤ X |
|---|---|
| 0.05 | 23.244680 |
| 0.10 | 45.445390 |
| 0.15 | 64.331210 |
| 0.20 | 78.919860 |
| 0.25 | 88.773760 |
| 0.30 | 94.498584 |
| 0.35 | 97.451065 |
| 0.40 | 98.787236 |
| 0.45 | 99.408513 |
| 0.50 | 99.707804 |

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for embedding a watermark onto a digitized image, comprising the steps of:

calculating a secret key used for embedding the watermark;

splitting the digitized image into constituent planes;

splitting each constituent plane into a plurality of microblocks based upon the secret key, the microblocks having a shape of a rectilinear polygon;

grouping the microblocks into a plurality of macroblocks based upon the secret key, the macroblocks being a group of microblocks; and watermarking each macroblock while diffusing the error.

2. The method according to claim 1, wherein the step of calculating a secret key comprises the steps of:

calculating an initial key from a seed value and a mapping function, the seed value being derived from image dependent/independent parameters; and encrypting the initial key to form the secret key.

3. The method according to claim 1, wherein the step of splitting each constituent plane into microblocks comprises the steps of:

leaving an offset in each constituent plane based upon the secret key; and dividing each constituent plane into a plurality of non-overlapping microblocks of a rectilinear polygon shape.

4. The method according to claim 3, wherein an offset is left in a region in each of the constituent planes having the lowest information content, based upon the secret key.

5. The method according to claim 1, wherein the step of grouping the microblocks into a plurality of macroblocks comprises the steps of:

choosing the constituent plane with the smallest size as an indexing plane (IP) and choosing the remaining constituent planes as watermarking planes (WPs);

determining a value representative of the IP;

dividing the value representative of the IP into non-overlapping intervals of a size substantially equal to twice the amount by which the change in microblock property value will not exceed;

determining a value representative of a WP;

dividing the value representative of the WP into non-overlapping intervals of size substantially equal to the amount by which the change in microblock property value will not normally exceed;

mapping each of the non-overlapping intervals into a 0 or 1 bit;

manipulating a property value of each microblock in each of the constituent planes to be a mid value of its non-overlapping interval by manipulating each of a plurality values that correspond to a plurality of pixels in the microblock;

selecting one of the WPs;

duplicating the IP to make it substantially the same size as the WP;

forming a free list of the microblocks in the IP and the selected WP, the free list being a list of microblocks in the IP and the selected WP that have not been grouped into a macroblock; and grouping the microblocks of the selected WP into macroblocks until no more microblocks can be grouped into macroblocks.

6. The method according to claim 5, wherein the step of forming a free list comprises the steps of:

selecting a microblock in a selected constituent plane on the basis of the secret key;

appending the selected microblock to the free list; and repeating the selecting and appending steps until all microblocks are exhausted.

7. The method according to claim 5, wherein the step of grouping the microblocks comprises the steps of:

selecting an initial microblock in the IP free list based on the secret key;

selecting an initial microblock in the WP free list based on a spatial correspondence function of the selected IP microblock;

appending the selected WP microblock to a selected WP macroblock;

selecting a next IP microblock using a mapping function and a property value of a current IP microblock;

selecting a next WP microblock in the WP free list based on the spatial correspondence function of the selected IP microblock;

deleting the used IP and WP microblocks; and repeating the selecting a next IP microblock, selecting a next WP microblock and appending steps until the current macroblock is complete.

8. The method according to claim 1, wherein the step of grouping the microblocks into a plurality of macroblocks comprises the steps of:

splitting each of the constituent image planes into two portions on the basis of the secret key, the two portions being an indexing plane (IP) and a watermarking plane (WP);

choosing a smaller portion of each constituent image plane as the IP;

dividing a value representative of the IP into a plurality of non-overlapping intervals of a size substantially equal to twice the amount by which the change in microblock property value will not exceed;

dividing a value representative of the WP into a plurality of non-overlapping intervals of a size substantially equal to the amount by which the change in microblock property value will not exceed;

mapping each of the non-overlapping intervals into a 0 or 1 bit;

manipulating a property value of each microblock in each of the constituent planes to be a mid value of the non-overlapping interval by changing each of a plurality values that correspond to a plurality of pixels in the microblock;

duplicating the IP in order to make it substantially the same size as the WP;

forming a free list of the microblocks in the IP and the selected WP, the free list being a list of microblocks in the IP and the WP that have not been grouped into a macroblock; and grouping the microblocks of the WP into macroblocks until no more microblocks can be grouped into macroblocks.

9. The method according to claim 8, wherein the step of forming a free list comprises the steps of:

selecting a microblock in an image portion on the basis of the secret key;

appending the selected microblock to the free list; and repeating the selecting and appending steps until all microblocks are used.

10. The method according to claim 8, wherein the step of grouping the microblocks comprises the steps of:

selecting an initial microblock in the IP free list based on the secret key;

selecting an initial microblock in the WP free list based on a spatial correspondence function of the selected IP microblock;

appending the selected WP microblock to the current WP macroblock;

selecting a next IP microblock using a mapping function and the property value of the current IP microblock;

selecting a next WP microblock in the WP free list based on the spatial correspondence function of the selected IP microblock;

deleting the IP and WP microblocks that have been grouped into macroblocks; and repeating the selecting a next IP microblock, selecting a next WP microblock and appending steps until the current macroblock is complete.

11. The method according to claim 1, wherein the step of watermarking each macroblock comprises the steps of:

calculating a property value of the macroblock;

quantizing the property value;

encrypting the property value based on the secret key; and embedding a one bit in each of the microblocks.

12. The method according to claim 11, wherein the one bit is stored in each of the microblocks in accordance with the following steps:

checking a microblock property value to determine if the property value corresponds to a value of the one bit to be stored;

storing the one bit in a microblock having an unmodified property value when the unmodified property value corresponds to the bit to be embedded;

storing the one bit in a microblock having a modified property value when the modified property value corresponds to the one bit to be embedded; and selecting a next microblock and repeating the checking and both storing steps until no more microblocks remain.

13. A method for extracting a watermark from the obtained digitized image, comprising the steps of:

calculating a secret key;

splitting an image into constituent planes;

splitting each constituent plane into a plurality of microblocks based upon the secret key;

grouping the microblocks into a plurality of macroblocks based upon the secret key, the macroblocks being groups of microblocks; and verifying each macroblock by recovering the embedded watermark.

14. The method according to claim 13, wherein the step of calculating a secret key comprises the steps of:

calculating an initial key from a seed value and a mapping function, the seed value being derived from image dependent/independent parameters; and encrypting the initial key to form the secret key.

15. The method according to claim 13, wherein the step of splitting each constituent plane into microblocks comprises the steps of:

leaving an offset in each constituent plane based upon the secret key; and dividing each constituent plane into a plurality of non-overlapping microblocks of a rectilinear polygon shape.

16. The method according to claim 15, wherein an offset is left in a region in each of the constituent planes having the lowest information content, based upon the secret key.

17. The method according to claim 13, wherein the steps of grouping the microblocks into a plurality of macroblocks comprises the steps of:

choosing the constituent plane with the smallest size as an indexing plane (IP) and choosing the remaining constituent planes as watermarking planes (WP);

determining a value representative of the IP;

dividing the value representative of the IP into non-overlapping intervals of a size substantially equal to twice the amount by which the change in microblock property value will not exceed;

determining a value representative of the WP;

dividing the value representative of the WP into non-overlapping intervals of size substantially equal to the amount by which the change in microblock property value will not normally exceed;

mapping each of the non-overlapping intervals into a 0 or 1 bit;

manipulating a property value of each microblock in each of the constituent planes to be a mid value of its non-overlapping interval by manipulating each of a plurality values that correspond to a plurality of pixels in the microblock;

selecting one of the WP;

duplicating the IP to make it substantially the same size as the WP;

forming a free list of the microblocks in the IP and the selected WP, the free list being a list of microblocks in the IP and the selected WP that have not been grouped into a macroblock; and grouping the microblocks of the selected WP into macroblocks until no more microblocks can be grouped into macroblocks.

18. The method according to claim 17, wherein the step of forming a free list comprises the steps of:

selecting a microblock in a selected constituent plane on the basis of the secret key;

appending the selected microblock to the free list; and repeating the selecting and appending steps until all microblocks are exhausted.

19. The method according to claim 17, wherein the step of grouping the microblocks comprises the steps of:

selecting an initial microblock in the IP free list based on the secret key;

selecting an initial microblock in the WP free list based on a spatial correspondence function of the selected IP microblock;

appending the selected WP microblock to a selected WP macroblock;

selecting a next IP microblock using a mapping function and a property value of a current IP microblock;

selecting a next WP microblock in the WP free list based on the spatial correspondence function of the selected IP microblock;

deleting the used IP and WP microblocks; and repeating the selecting a next IP microblock, selecting a next WP microblock and appending steps until the current macroblock is complete.

20. The method according to claim 13, wherein the step of grouping the microblocks into a plurality of macroblocks comprises the steps of:

splitting each of the constituent image planes into two portions on the basis of the secret key, the two portions being an indexing plane (IP) and a watermarking plane (WP);

choosing a smaller portion of each constituent image plane as the IP;

dividing a value representative of the IP into a plurality of non-overlapping intervals of a size substantially equal to twice the amount by which the change in microblock property value will not exceed;

dividing a value representative of the WP into a plurality of non-overlapping intervals of a size substantially equal to the amount by which the change in microblock property value will not exceed;

mapping each of the non-overlapping intervals into a 0 or 1 bit;

manipulating a property value of each microblock in each of the constituent planes to be a mid value of the non-overlapping interval by changing each of a plurality values that correspond to a plurality of pixels in the microblock;

duplicating the IP in order to make it substantially the same size as the WP;

forming a free list of the microblocks in the IP and the selected WP, the free list being a list of microblocks in the IP and the WP that have not been grouped into a macroblock; and grouping the microblocks of the watermarking portion into macroblocks until no more microblocks can be grouped into macroblocks.

21. The method according to claim 20, wherein the step of forming a free list comprises the steps of:

selecting a microblock in an image portion on the basis of the secret key;

appending the selected microblock to the free list; and repeating the selecting and appending steps until all microblocks are used.

22. The method according to claim 20, wherein the step of grouping the microblocks comprises the steps of:
- selecting an initial microblock in the IP free list based on the secret key;
- selecting an initial microblock in the WP free list based on a spatial correspondence function of the selected IP microblock;
- appending the selected WP microblock to the current WP macroblock;
- selecting a next IP microblock using a mapping function and the property value of the current IP microblock;
- selecting a next WP microblock in the WP free list based on the spatial correspondence function of the selected IP microblock;
- deleting the IP and WP microblocks that have been grouped into macroblocks; and
- repeating the selecting a next IP microblock, selecting a next WP microblock and appending steps until the current macroblock is complete.

23. The method according to claim 13, wherein the step of verifying each macroblock comprises the steps of:
- calculating a property value of the macroblock;
- selecting a microblock within the macroblock;
- determining a value of a bit embedded in the selected microblock;
- repeating the steps of selecting and determining for the remaining microblocks;
- determining a bit sequence resulting from the picking and determining steps;
- decrypting the bit sequence;
- extracting a value embedded in the decrypted bit sequence;
- comparing the property value of the macroblock with the value of the decrypted sequence; and
- accepting the macroblock if the difference between the property value of the microblock and the value of the decrypted sequence is less than an allowable error or rejecting the macroblock if the difference between the property value of the microblock and the value of the decrypted sequence is greater than an allowable error.

24. A computer program product comprising a computer usable medium having computer readable program code embodied in the medium for embedding a watermark onto a digitized image, the computer program product having:
- first computer program code for calculating a secret key used for embedding the watermark;
- second computer program code for splitting the digitized image into constituent planes;
- third computer program code for splitting each constituent plane into a plurality of microblocks based upon the secret key, the microblocks having a shape of a rectilinear polygon;
- fourth computer program code for grouping the microblocks into a plurality of macroblocks based upon the secret key, the macroblocks being a group of microblocks; and
- fifth computer program code for watermarking each macroblock while diffusing the error.

25. The computer program product according to claim 24, wherein the first computer program code for calculating a secret key further comprises:
- sixth computer program code for calculating an initial key from a seed value and a mapping function, the seed value being derived from image dependent/independent parameters; and
- seventh computer program code for encrypting the initial key to form the secret key.

26. The computer program product according to claim 24, wherein the third computer program code for splitting each constituent plane into a plurality of microblocks further comprises:
- eighth computer program code for leaving an offset in each constituent plane based upon the secret key; and
- ninth computer program code for dividing each constituent plane into a plurality of non-overlapping microblocks of a rectilinear polygon shape.

27. The computer program product according to claim 24, wherein the fourth computer program code for grouping the microblocks into a plurality of macroblocks further comprises:
- tenth computer program code for choosing the constituent plane with the smallest size as an indexing plane (IP) and choosing the remaining constituent planes as watermarking planes (WPs);
- eleventh computer program code for determining a value representative of the IP;
- twelfth computer program code for dividing the value representative of the IP into non-overlapping intervals of a size substantially equal to twice the amount by which the change in microblock property value will not exceed;
- thirteenth computer program code for determining a value representative of a WP;
- fourteenth computer program code for dividing the value representative of the WP into non-overlapping intervals of size substantially equal to the amount by which the change in microblock property value will not normally exceed;
- fifteenth computer program code for mapping each of the non-overlapping intervals into a 0 or 1 bit;
- sixteenth computer program code for manipulating a property value of each microblock in each of the constituent planes to be a mid value of its non-overlapping interval by manipulating each of a plurality values that correspond to a plurality of pixels in the microblock;
- seventeenth computer program code for selecting one of the WPs;
- eighteenth computer program code for duplicating the IP to make it substantially the same size as the WP;
- nineteenth computer program code for forming a free list of the microblocks in the IP and the selected WP, the free list being a list of microblocks in the IP and the selected WP that have not been grouped into a macroblock; and
- twentieth computer program code for grouping the microblocks of the selected WP into macroblocks until no more microblocks can be grouped into macroblocks.

* * * * *